Oct. 6, 1964   M. O'BRIEN   3,151,742
FRUIT SIZER, SORTER AND BIN FILLER
Filed Feb. 28, 1962   6 Sheets-Sheet 1

INVENTOR.
MICHAEL O'BRIEN
BY
Lothrop & West
ATTORNEYS

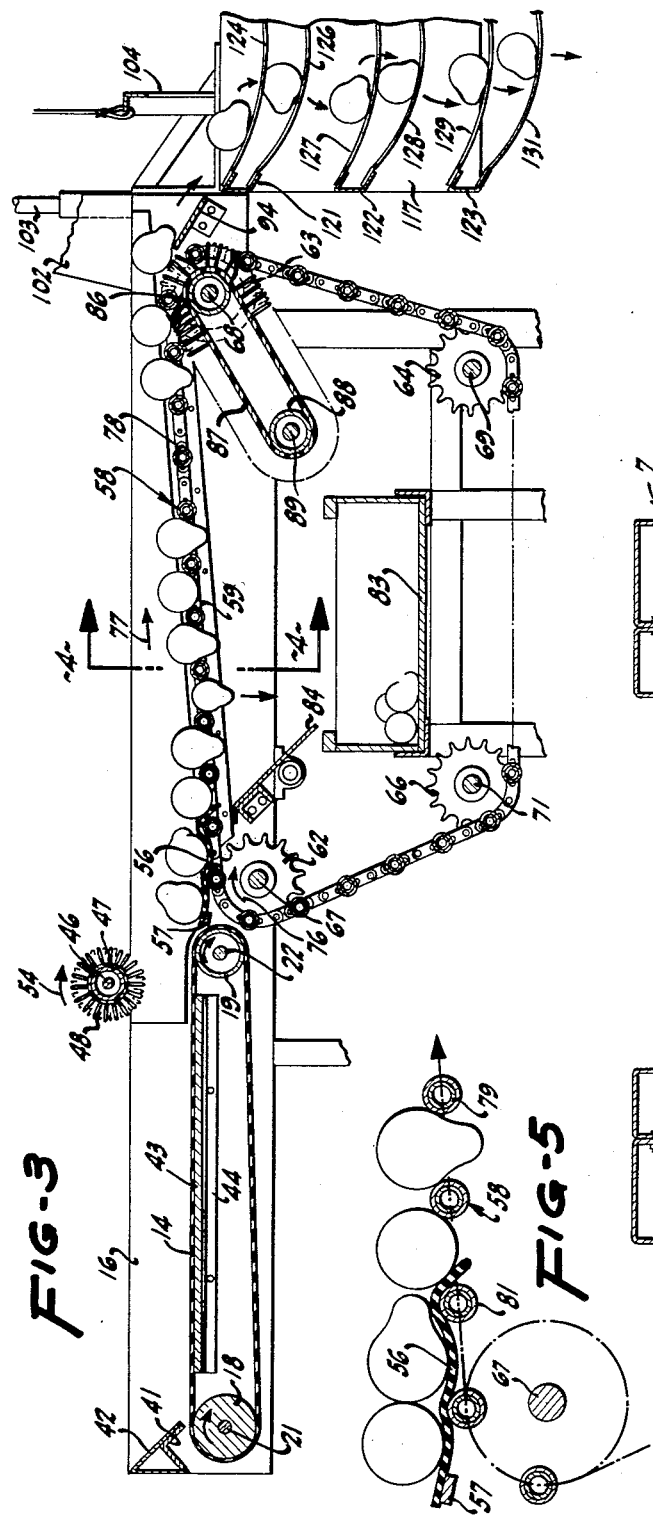

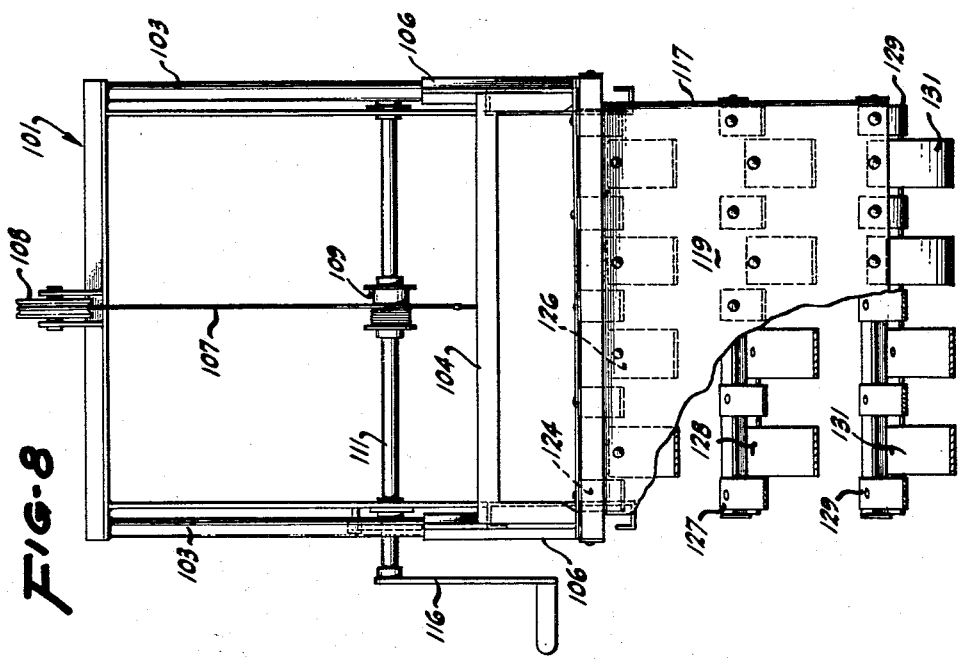
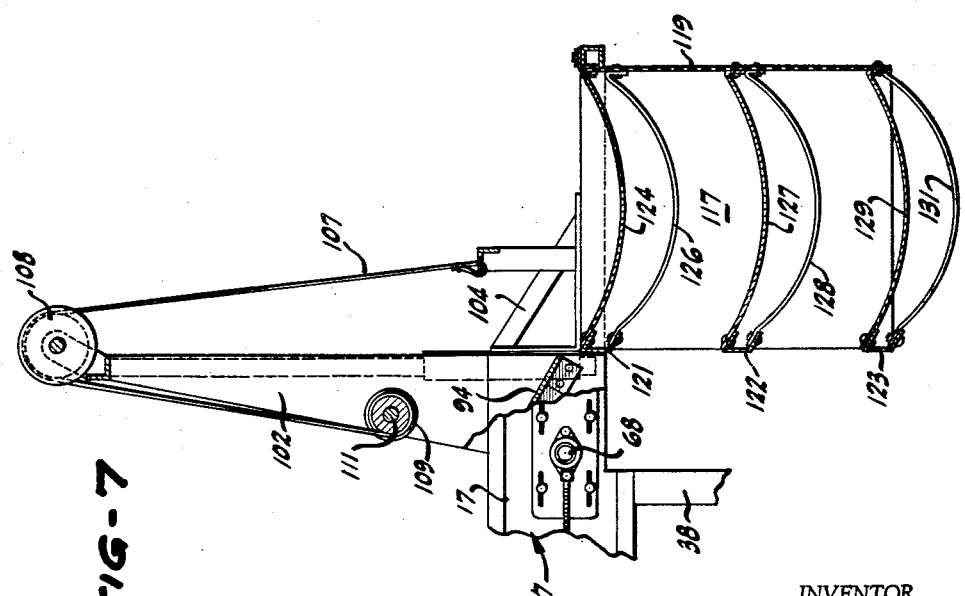

Oct. 6, 1964 M. O'BRIEN 3,151,742
FRUIT SIZER, SORTER AND BIN FILLER
Filed Feb. 28, 1962 6 Sheets-Sheet 5

INVENTOR.
MICHAEL O'BRIEN
BY
Lothrop & West
ATTORNEYS

United States Patent Office 3,151,742
Patented Oct. 6, 1964

3,151,742
FRUIT SIZER, SORTER AND BIN FILLER
Michael O'Brien, Davis, Calif., assignor to The Regents of the University of California, Berkeley, Calif.
Filed Feb. 28, 1962, Ser. No. 176,311
8 Claims. (Cl. 209—103)

My invention relates to machines especially useful in agriculture for handling fruit as it is picked and for delivering the fruit for inspection, sizing and sorting and then for further handling. The invention especially relates to such a machine that also is readily portable so that it can easily be moved about from place to place for use, even in the fruit picking area.

In the present handling of many fruits such as pears, the fruit is picked from the trees and is discharged at random into some sort of container for transport to the packing house.

All of the picked fruit must be hauled for inspection and selection to the permanent installations in the packing house. It is becoming increasingly important, particularly with the bulk handling of fruit in bins, to have an inspection and grading mechanism available for use even in the orchard so that fruit which does not meet with the appropriate standards need not be handled any further, but can be eliminated at the very source of handling, thus reducing the bulk that must be hauled.

It is therefore an object of my invention to provide a device which can be utilized anywhere in the fruit handling area, even in the orchard itself wherein the fruit is originally picked, for use in inspecting, sizing and loading the fruit.

Another object of the invention is to provide a simple straight-forward and direct means for handling a relatively large quantity of fruit so that undersized or defective fruit can promptly be eliminated and so that the appropriately passed fruit is delivered into a box or bin for further handling.

Another object of the invention is to provide a mechanism of this kind and preferably power driven so that its capacity is relatively great and with very little in the way of manual effort being needed to carry out the sizing, sorting and bin filling operation.

Another object of the invention is in general to provide an improved fruit handling structure.

Other objects together with the foregoing are attained in the embodiment of the invention described in the accompanying description and illustrated in the accompanying drawings in which:

FIGURE 3 is a cross section, the plane of which is indicated by the line 3—3 of FIGURE 2;

FIGURE 4 is a cross section, a portion being broken away, the plane of section being indicated by the line 4—4 of FIGURE 3;

FIGURE 5 is an enlarged detail showing the initial portion of the sizing mechanism;

FIGURE 6 is a showing of the sizing mechanism indicating the manner of varying the sizes accepted and rejected;

FIGURE 7 is a detailed side elevation of the discharge end of the structure, a portion being shown in cross section on a central vertical plane extending in a longitudinal direction;

FIGURE 8 is an end elevation, portions being omitted to reduce the size of the figure, showing the structure generally illustrated in FIGURE 1;

Figure 1:
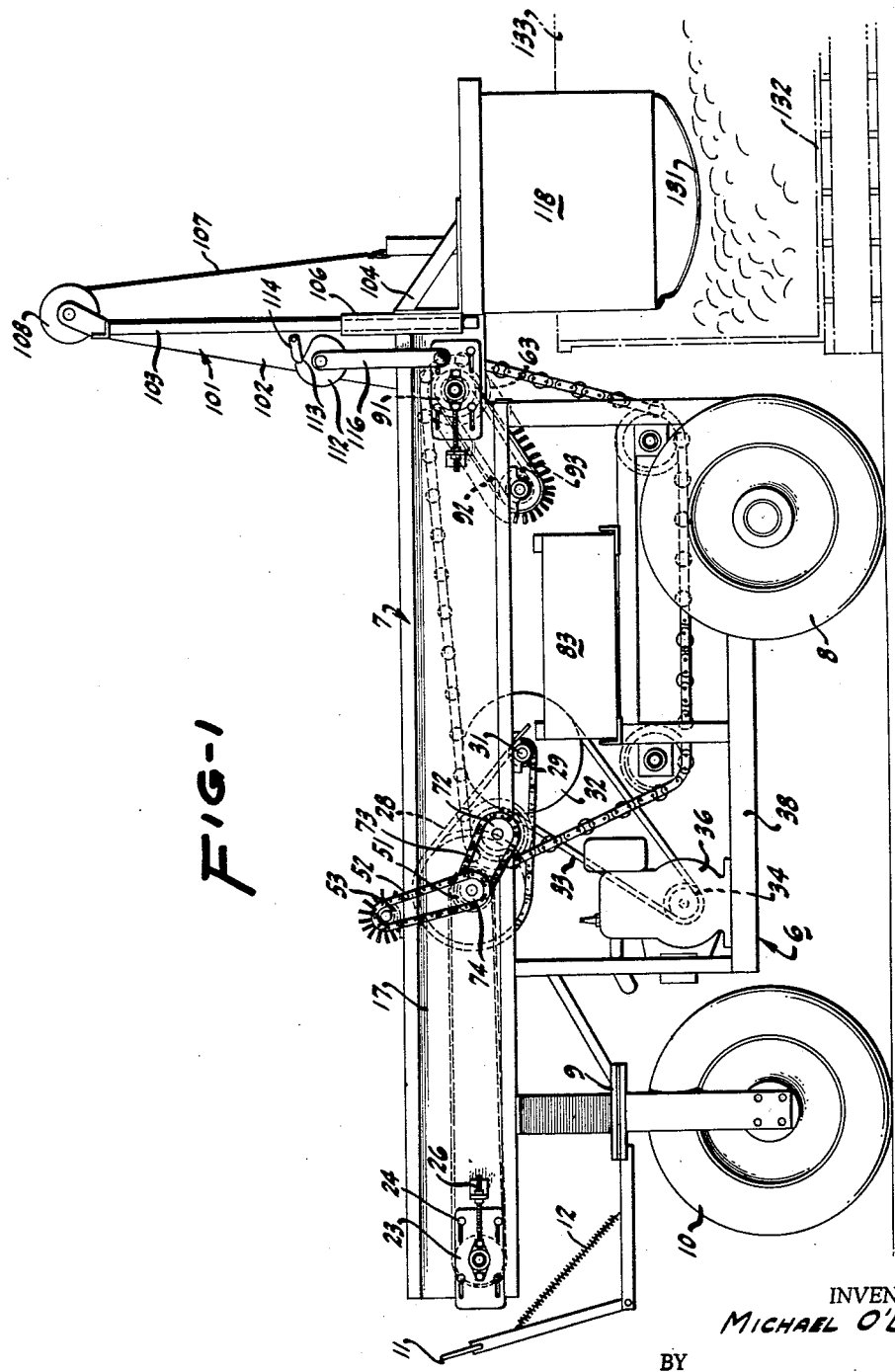
FIGURE 1 is a side elevation of a device constructed pursuant to my invention as it is installed for use in filling a bin.

Although the fruit sizer, sorter and bin filler of the invention can be embodied in a number of different ways, it has successfully been embodied and worked in the form shown herein. In this arrangement there is provided a carriage 6 having a main frame 7 comprised of suitable structural angles, shapes and the like appropriately fastened together. At one end the frame is supported on a pair of ground-engaging pneumatic tires 8 and at the other end is connected through a central steering pivot 9 to a single ground-engaging pneumatic tire 10. A hinged draft handle 11 normally retained out of the way by a spring 12 is connected to the pivot mechanism 9 so that the carriage 6 can be transported from place to place and the wheel 10 can be appropriately steered.

On the frame 7 adjacent the handle 11 there is disposed (FIGURE 3) a receiving conveyor belt 14 extending laterally or transversely between side boards 16 and 17 on the frame 7 and trained around a pair of rollers 18 and 19. The belt 14 has sufficient area to afford adequate room for visual inspection of fruit and is at a convenient height so that unwanted fruits can be quickly and easily removed by hand. The rollers are on shafts 21 and 22 journalled in the frame 7. The shaft 21 at its opposite outboard ends is supported in slidable blocks 23 having clamping screws 24 and an adjusting bolt 26 so that the tension in the belt 14 can be regulated.

Figure 2:
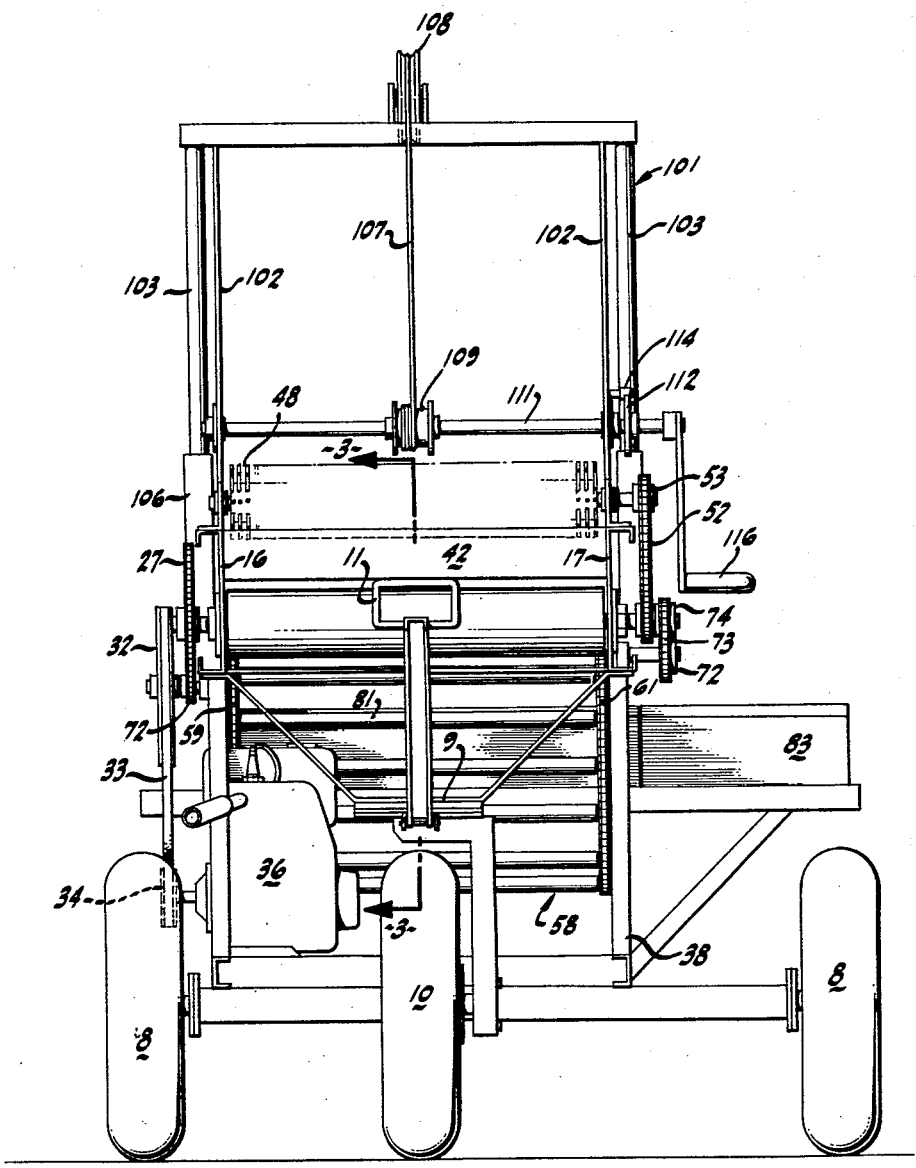
FIGURE 2 is a front elevation of the structure shown in FIGURE 1.

The shaft 22 extends at one end from the side board 16 (FIGURE 2) and outboard thereof carries a drive sprocket 27 around which a chain 28 is arranged. The chain is also in engagement with a drive sprocket 29 on a jack shaft 31 suitably mounted by journals beneath the frame 7. Also on the jack shaft 31 is a driven sprocket 32 in engagement with a drive chain 33 extending to an appropriate sprocket 34 on a source of motive power such as an internal combustion engine 36. The engine is supported on a depending portion 38 of the main frame 7 and when operated is effective to rotate the jack shaft 31 and so to revolve the shaft 22 and to drive the receiving belt 14 with the uppermost run thereof travelling forwardly or to the right as seen in FIGURE 3.

The leading end of the belt 14 is partially protected by a cross angle 41 on which an apron 42 rests so that fruit dumped onto the belt 14 will be appropriately retained and directed forwardly. The upper run of the belt 14 is supported by a cross panel 43 resting on angles 44 secured to the main frame side members 16 and 17 so that a substantial weight of received fruit on the belt 14 does not cause undue sag.

In order that the fruit can momentarily be piled relatively high onto the receiving belt 14 without tumbling forwardly in an inordinate amount, there is suitably journalled on the side members 16 and 17 a cross shaft 46 carrying a hollow drum 47 around which a section of finger belting 48 is disposed. The finger belting is normally purchased in the form of a flat rubber sheet having integrally molded thereon a number of upstanding rubber fingers in a fairly regular array. An appropriate length of such a sheet is circumferentially affixed to the drum 47 so that the fingers extend radially therefrom to an appropriate elevation.

On its outboard end near the side member 17, the driven shaft 22 carries an appropriate sprocket 51 joined by a chain 52 to a similar sprocket 53 on the shaft 46 so that the finger drum is revolved clockwise, as seen in FIGURE 3, in the direction of the arrow 54. The depending fingers then brush any forwardly advancing fruit toward the rear so that fruit only one layer deep can move forwardly to discharge over the trailing end of the belt 14.

A mass of fruit such as pears, for example, after having been deposited on the belt 14 and after having undesired fruit manually removed, is impelled to travel in a single layer underneath the drum fingers and then passes over a flexible apron 56. This is preferably comprised of a sheet of rubber or a like elastomer at one end secured to a cross bar 57 spanning the distance between and mounted on the side members 16 and 17.

Appropriately mounted on the frame 7 and designed to receive the fruit after it has left the initial conveyor 14 is a sizing conveyor 58. This includes a pair of side chains 59 and 61 trained around a pair of upper leading sprockets 62, a pair of upper trailing sprockets 63, a pair of lower trailing sprockets 64 and a pair of lower leading sprockets 66. The pairs of sprockets at the upper portion of the frame are appropriately fastened on cross shafts 67 and 68 and the pairs of idler sprockets at the lower portion of the frame are fastened on cross shafts 69 and 71.

At one outboard end of the shaft 67 there is provided a chain sprocket 72 around which a chain 73 is arranged. This chain is also in engagement with a driving sprocket 74 on the shaft 22 ultimately driven by the internal combustion engine 36. The result of this connection is that the shaft 67 is advanced in the direction of the arrow 76 in FIGURE 3 so that the upper run of the conveyor 58 advances in the direction of the arrow 77 in that figure.

Spanning the space between appropriate fastening clips 78 on the chains are permanently affixed cross tubes 79 (FIGURES 4 and 6). If all of the tubes are of the diameter shown in the right-hand end of FIGURE 6, a large-size pear can pass between successive ones of the tubes 79. However, it is arranged that one or more sizing tubes 81 and 82 can be concentrically positioned around the basic tubes 79 to afford different spacings between successive tubes as indicated by the arrows A, B and C of FIGURE 6. In some instances some of the tubes 79 are left just as they are whereas alternate tubes are provided with jackets or sleeves such as 81. By this means a large number of different sizes can be accommodated.

As the belt 58 advances, the cross tubes 79 successively ride under the flexible apron 56 and produce considerable undulation or agitation thereof. The general direction of advance is from left to right, however. The net result of this arrangement is that the pears which travel across the apron 56 are vibrated and agitated so as generally to orient themselves with their smaller or stem ends to one side or the other.

As the pears advance beyond the end of the apron 56, they tend to rotate by gravity from their sidewise position into a position with the stem end downwardly, largely as shown in FIGURE 3. Any pears which are too small to be supported between successive ones of the tubes 79 (whether or not jacketed) are discharged by gravity into a container 83 provided removably on the frame for that purpose. A deflector 84 directs into the container any pears which fall immediately upon entering the conveyor 58. Thus only pears over a predetermined size are carried by the conveyor toward the discharge end thereof. The small fruit dropping through the conveyor 58, having been inspected, is saleable and usually brings about sixty percent of the price of the large fruit. If there is a large quantity of small fruit, the container 83 can be easily replaced by a laterally disposed chute or belt conveyor driven by the engine 36, if desired, and leading to a point for further handling of the small fruit.

Means are provided for ejecting the pears from the conveyor 58. Turning on the shaft 68 and freely mounted thereon but not driven thereby is a belt drum 86 for supporting a loop of finger belt 87. The other end of the belt 87 is trained around a roller 88 mounted on a shaft 89 journalled on the frame 7. The shaft 68 is keyed to a sprocket 91 joined by a chain 92 to a driven sprocket 93 on the shaft 89 so that the drum 86 revolves considerably faster than the shaft 68. The finger belt 87 is arranged so that while the main body of the belt is spaced from the cross tubes 79 the fingers on the belt are flexible enough to project or spring into the spaces between the successive tubes 79 and are of sufficient length and strength to eject or lift the pears therefrom. A guide plate 94 extending between the side members 16 and 17 of the frame directs the ejected fruit toward an appropriate discharge device.

Since pears are relatively delicate and should not be dropped very far into a relatively hard bin, I provide a special means for gently easing the pears into the bin or other container. At the discharge end of the frame 7 there is provided a superstructure 101 including triangular support plates 102 and a pair of elevator tubes 103. Sliding on the tubes 103 is an elevator frame 104 having sleeve guides 106 in engagement with the tubes 103.

To the frame 104 is secured a cable 107 trained around a pulley 108 at the upper portion of the superstructure 101 and passing downwardly therefrom over a winch drum 109 situated on a cross shaft 111 appropriately journalled in the superstructure plates 102. A cam disk 112 with a notch 113 therein is normally held against retrograde movement by a hand-operated latch 114 or pawl. A hand crank 116 on the end of the shaft 111 affords means for rotating the drum 109 in a direction to lift the elevator frame 104. When the latch 114 is released the shaft 111 can be moved in a retrograde or lowering direction a single turn at a time for the gravity biased pawl 114 or latch holds the cam disk 112 whenever the notch is encountered.

Depending from the elevator frame 104, which is generally rectangular in plan, are the side walls 117 and 118 and the front wall 119 of a confining device. These walls are preferably fabricated of canvas belting or the like so they are somewhat flexible and yet are effective to confine the pears. Extending parallel to the front wall 119 between the side walls 117 and 118 are cross channels 121, 122 and 123 respectively. Spanning the space between the channel 121 and the forward end of the elevator frame 104 is a plurality of relatively narrow fabric straps 124 and interspersed with these is a plurality of relatively wide fabric flexible straps 126. The positions of and the sag in the respective straps 124 and 126 are sufficient to allow adequate room for pears to travel therebetween in a tortuous or sinuous path.

Similarly extending between the channel 122 and the central portion of the forward wall 119 are comparable flexible fabric straps 127 and 128 also arranged in a staggered and spaced relationship. Similarly, a series of narrow straps 129 and a series of wide straps 131 span the space between the lowermost channel 123 and the lower part of the front wall 119. The vertical spacing between the channel 121 and the channel 122 and also between the channel 122 and the channel 123 is just that amount which can be produced by the rotation of the crank 116 through one revolution.

When the mechanism is first started, the elevator frame 104 is placed in its lower position as shown in FIGURES 1 and 7. This places the bottom-most wide straps 131 a reasonable distance from the bottom 132 of the receiving bin 133. Consequently, when the pears are discharged over the plate 94 they follow a sinuous path as illustrated at the right-hand end of FIGURE 3 first onto the upper narrow straps 124 and between them, thence onto and between the wider straps 126, thence onto the subjacent straps 127 and 128 and finally in a continuation of the sinuous path onto and between the lowermost straps 129 and 131. When the pears finally drop onto the bottom 132 of the bin, they have such a low velocity as not to become bruised.

As the bin 133 is gradually filled, the operator gives the crank 116 a single rotation, locking the crank in its new position by means of the latch 114. This raises the elevator frame 104 through one increment or step so as to place the straps 127 and 128 in receiving position with regard to the discharge plate 94. The pears then fall onto and between the straps 127 and 128 in a sinuous path and finally drop only a small distance onto the other pears already in the bin. By further rotation of the crank 116 through one turn, the user ultimately lifts the elevator frame 104 so as to place the straps 129 and 131 in position to receive the pears from the discharge plate 94. Thus the pears are always sufficiently baffled and retarded in their gravity discharge from the plate 94 as to lodge gently within the bin 133.

In the usual use of this mechanism, the pears as picked are dumped at random onto the belt 14 and an inspector or grader makes an initial inspection and grading thereof, picking out by hand any defective fruit. Sound fruit not so removed but of all sizes then proceeds onto the grading belt 58, from which the undersized fruit discharges by gravity into the container 83 from which it is ultimately removed. The inspected fruit of appropriate size then is gently discharged into the bin 133 for further handling.

Figure 9:
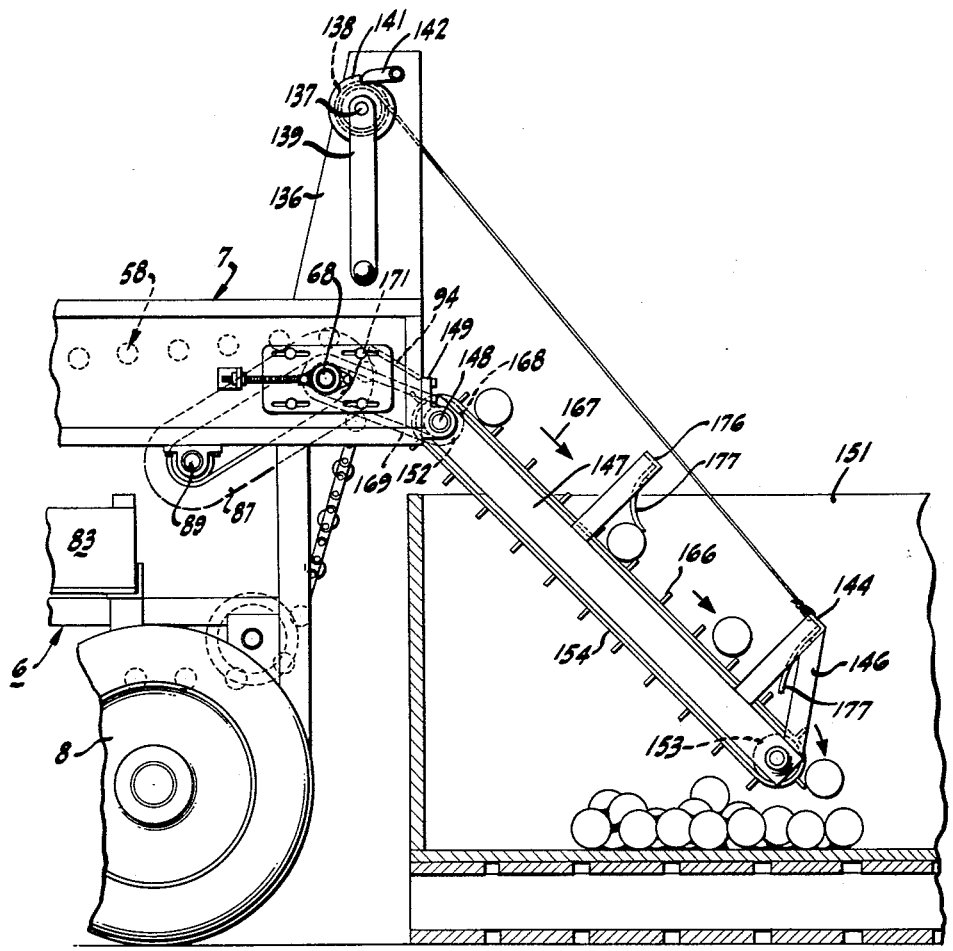
FIGURE 9 is a side elevation somewhat similar to FIGURES 1 and 7 but disclosing a modified form of mechanism for discharging fruit into a bin.

As an alternate form of discharge mechanism in lieu of the belt structure particularly illustrated in FIGURE 8, I have utilized a device as shown in FIGURE 9. Herein the frame 7 remains as before but receives a superstructure 136 of somewhat lesser height carrying a cross shaft 137 on which a winch drum 138 is mounted for rotation by a hand crank 139. As before, a cam disk 141 and a latch 142 are provided for holding the shaft 137 in indexed position and to allow one turn at a time to be made. From the winch drum 138 a tension cable 143 extends to an anchorage 144 on the outboard end of a framework 146.

The side members 147 of the framework are pivoted on a cross shaft 148 extending transversely of the frame 7 and carried in suitable journals 149 thereof. By taking in and paying out the cable 143 the framework 146 can be lifted and lowered. The length of the frame is sufficient to position it at a suitable location in a standard bin 151. Trained around appropriate rollers 152 and 153 on the framework 146 is a conveyor belt 154 having a series of upstanding transverse cleats 166 thereon, the cleats being spaced so as readily to accommodate the fruit being handled. The conveyor 154 is driven in the direction of the arrows 167 in FIGURE 9. For this purpose the shaft 148 carries a sprocket 168 joined by a chain 169 to a sprocket 171 on the cross shaft 68.

With this arrangement the pears discharging over the plate 94 are smoothly received by the upper run of the conveyor belt 154 and lodge between successive cleats 166. The speed of advance of the conveyor belt is such that the pears are gradually lowered into the bin 151 and finally are gently discharged from the lower end thereof at such a low velocity as to preclude bruising. If desired, superstructure arches 176 on the framework 146 carry relatively stiff depending baffles 177 to intercept and slow any fruit which might otherwise tend to roll down the conveyor too fast and bruise itself. As the bin 151 is filled, the operator from time to time turns the crank 139 through one rotation and lifts the end of the conveyor frame 146. At the same time, if desired, the entire carriage 6 can be advanced or retracted to position the discharge end of the conveyor at an optimum location with regard to the bin 151.

Figure 10:
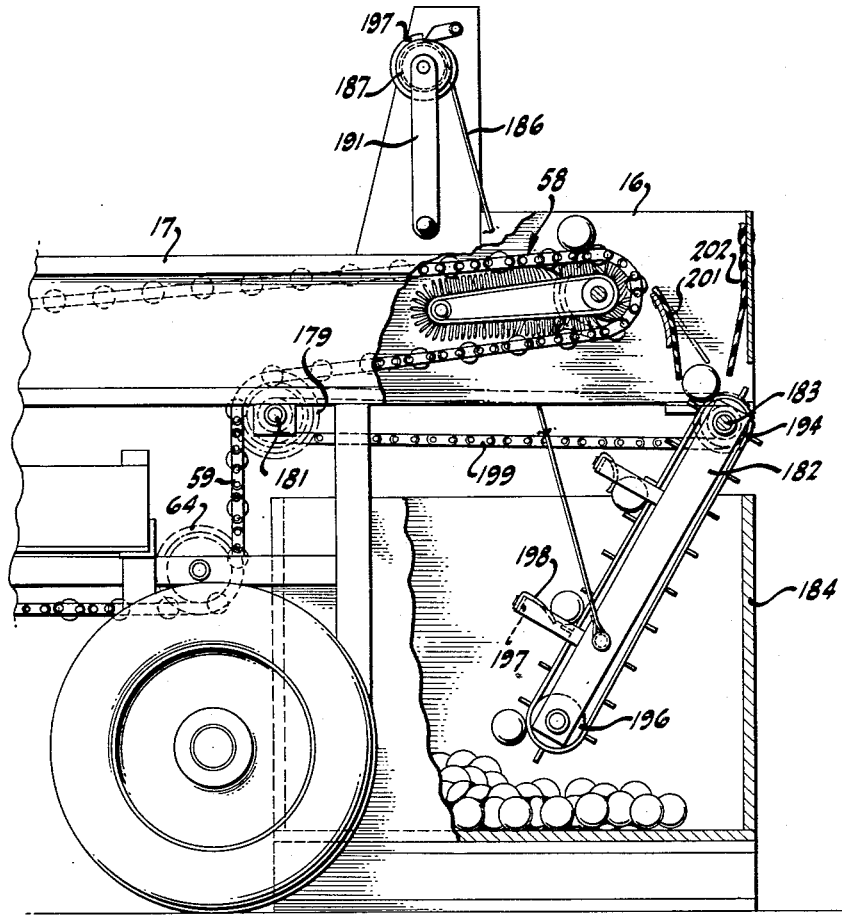
FIGURE 10 is a side elevation similar to FIGURE 9 but showing a modified form of mechanism for discharging fruit into a bin, portions being broken away to disclose the interior construction.

Another alternate form of discharge structure is shown in FIGURE 10. Generally, the parts are the same as or similar to those previously described. The side boards 16 and 17 are extended beyond the superstructure 101 as is the conveyor 58. Support sprockets 179 on a cross shaft 181 journalled in the frame 7 lead the lower, return run of the side chains 59 to the idler sprockets 64. The shaft 89 for the finger belt 87 is raised and the finger belt is relocated pursuant to the extension of the conveyor 58.

A discharge conveyor frame 182 is pivoted on a cross shaft 183 at the end of the frame 7 to swing above and down into a bin 184 disposed largely beneath the frame.

The position of the conveyor frame 182 is manually controlled by lines 186 fastened to the sides of that frame and wound on drums 187 at the ends of a cross shaft 189 provided at one end with a hand crank 191 and with a holding mechanism 192 of the sort shown in FIGURE 9.

On the conveyor frame 182 is arranged a cleated belt 193 trained around rollers 194 and 196 journalled on the frame. Arches 197 support stiff baffles 198 to slow otherwise tumbling fruit. The roller 194 and the belt 193 are driven by a chain 199 from the cross shaft 181.

Fruit advancing on the conveyor 58 and ejected by the fingers of the finger belt 87 travels between a pair of baffles 201 and 202 extending across the frame 7 and lodges on the belt 193 being lowered gently beneath the baffles 198 into the bin 184. The angle of the conveyor frame 182 is changed from time to time as the bin fills, the bin itself being advanced from time to time relative to the frame 7 to assure appropriate loading.

What is claimed is:

1. A fruit sizer, sorter and bin filler comprising a portable frame, a receiving conveyor belt on said frame disposed in a horizontal position at one end thereof, means on said frame at the discharge end of said receiving conveyor belt for blocking the advance of fruit about a predetermined height on said receiving conveyor belt, a sizing conveyor on said frame disposed in a horizontal position at the other end thereof, said sizing conveyor including a plurality of spaced apart transversely extending cross tubes, a flexible apron at one end mounted on said frame adjacent said receiving conveyor belt and at the other end resting on said cross tubes of said sizing conveyor, means on said frame for receiving fruit from said sizing conveyor, and means for raising and lowering said receiving means relative to said sizing conveyor.

2. A fruit sizer, sorter and bin filler comprising a carriage, a receiving conveyor belt on said carriage, a sizing conveyor on said carriage arranged at the discharge end of said receiving conveyor belt, a flexible apron on said carriage secured at one end adjacent the discharge end of said receiving conveyor belt and resting at the other end on said sizing conveyor, said sizing conveyor including a plurality of spaced apart transverse cross tubes, means on said carriage and projecting between said cross tubes for ejecting fruit from said sizing conveyor, and means on said carriage for receiving fruit from said sizing conveyor and for conducting said fruit to a selected discharge level.

3. A fruit sizer, sorter and bin filler comprising a frame, a receiving conveyor belt on said frame disposed in a horizontal position at one end thereof, a sizing conveyor on said frame disposed in a horizontal position at the other end thereof, said sizing conveyor including a plurality of spaced apart cross members, a flexible apron secured to said frame adjacent the discharge end of said receiving conveyor belt and extending onto said cross members, and means on said frame adjacent the discharge end of said sizing conveyor for receiving fruit therefrom and for conducting said fruit to a selected discharge level.

4. A fruit sizer, sorter and bin filler comprising a frame, a receiving conveyor belt on said frame adjacent one end thereof, a sizing conveyor on said frame adjacent the other end thereof, said sizing conveyor including spaced apart cross members, a flexible apron on said frame between said receiving conveyor and said sizing conveyor and resting on said cross members, and means on said frame for receiving and conducting fruit from said sizing conveyor to a selected discharge level.

5. A fruit sizer, sorter and bin filler as in claim 1 in which there is also a prime mover on said frame, and means for driving said receiving conveyor and said sizing conveyor from said prime mover.

6. A fruit sizer, sorter and bin filler as in claim 2 in which there is also a prime mover on said frame, and means for driving said sizing conveyor and said ejecting means from said prime mover.

7. A fruit sizer, sorter and bin filler comprising a frame, a sizing conveyor on said frame, said sizing conveyor including a plurality of spaced apart cross members, a belt having flexible fingers projecting therefrom, means on said frame for mounting said belt to move said fingers into and out of the spaces between said cross members, means for advancing said sizing conveyor at a predetermined rate, and means for advancing said belt at a faster rate.

8. A fruit sizer, sorter and bin filler comprising a frame; a receiving conveyor belt on said frame disposed in a horizontal position at one end of said frame; a sizing conveyor on said frame disposed in a horizontal position at the other end of said frame, said sizing conveyor including a plurality of spaced apart transversely extending cross members; a flexible apron on said frame extending between the discharge end of said receiving conveyor belt and said sizing conveyor and resting upon said cross members; means on said frame above the discharge end of said receiving conveyor belt for blocking the advance of fruit above a predetermined height on said receiving conveyor belt; means on said frame and movable into the spaces between said cross members for ejecting fruit from said sizing conveyor; means on said frame for driving said receiving conveyor, said blocking means, said sizing conveyor and said ejecting means; and means on said frame for receiving fruit from said sizing conveyor and for conducting said fruit to a selected discharge level.

References Cited in the file of this patent

UNITED STATES PATENTS

| | | |
|---|---|---|
| 1,343,586 | Lang | June 15, 1920 |
| 1,712,670 | Madden | May 14, 1929 |
| 1,868,356 | Helenbolt | July 19, 1932 |

FOREIGN PATENTS

| | | |
|---|---|---|
| 113,735 | Sweden | Apr. 3, 1945 |